US011006505B2

(12) United States Patent
Mizerak et al.

(10) Patent No.: US 11,006,505 B2
(45) Date of Patent: May 11, 2021

(54) AUTOMATED RE-CREATION OF LIGHTING VISUAL FOR A VENUE (71) Applicant: Electronic Theatre Controls, Inc., Middleton, WI (US)

(72) Inventors: Christopher Mizerak, Oceanside, CA (US); Dennis Varian, Middleton, WI (US); Koen Buys, Hofstade (BE)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/708,752

(22) Filed: Dec. 10, 2019

(65) Prior Publication Data
US 2020/0187332 A1    Jun. 11, 2020

Related U.S. Application Data (60) Provisional application No. 62/777,493, filed on Dec. 10, 2018.

(51) Int. Cl.
*F21V 21/29*    (2006.01)
*H05B 47/155*    (2020.01)
(Continued)

(52) U.S. Cl.
CPC ............ *H05B 47/155* (2020.01); *E04H 3/22* (2013.01); *F21S 10/023* (2013.01);
(Continued)

(58) Field of Classification Search
CPC .... H05B 47/155; H05B 47/125; H05B 47/19; H05B 47/17; F21S 10/23; F21S 10/046; F21V 33/002; G02F 30/20
(Continued)

(56) References Cited

U.S. PATENT DOCUMENTS 5,009,502 A * 4/1991 Shih .................. G01S 7/4972
356/152.1
5,307,295 A    4/1994 Taylor et al.
(Continued)

FOREIGN PATENT DOCUMENTS

WO    2017042027 A1    3/2017
WO    2018200685 A2    11/2018

OTHER PUBLICATIONS

Non Patent Literature, "Articulated Structure and Its Kinematic Chain From Motion with Extension to Non-Rigid Parts", website: http://people.inf.ethz.ch/pomarc/pubs/YanAMDO06subm.pdf, webpage available at least as early as Sep. 17, 2018.
(Continued)

*Primary Examiner* — Ali Alavi
(74) *Attorney, Agent, or Firm* — Michael Best and Friedrich LLP (57) ABSTRACT Methods and systems for generating a lighting design for a venue. A lighting visual is selected. The lighting visual may be based on a different venue or a generated image. An electronic processor converts the lighting visual into lighting visual parameters. The processor receives mounting locations for lighting fixtures at the venue. A database of candidate lighting fixtures is accessed and a lighting design is generated that includes an arrangement of lighting fixtures and indicates which of the lighting fixtures is to be mounted in which location to produce a lighting effect at the venue that approximates the lighting visual. The lighting design may be based on multiple lighting visuals and corresponding visual parameters to produce multiple lighting effects at the venue that approximate the multiple visuals.

20 Claims, 10 Drawing Sheets (51) Int. Cl.
  *H05B 47/125*     (2020.01)
  *H05B 47/19*      (2020.01)
  *F21S 10/02*      (2006.01)
  *F21V 33/00*      (2006.01)
  *E04H 3/22*       (2006.01)
  *F21S 10/04*      (2006.01)
  *F21W 131/406*    (2006.01)

(52) U.S. Cl.
  CPC .......... *F21S 10/046* (2013.01); *F21V 33/006* (2013.01); *H05B 47/125* (2020.01); *H05B 47/19* (2020.01); *F21W 2131/406* (2013.01)

(58) Field of Classification Search
  USPC ...................................................... 362/277
  See application file for complete search history.

(56) References Cited

U.S. PATENT DOCUMENTS

| | | | |
|---|---|---|---|
| 5,406,176 A | 4/1995 | Sugden | |
| 5,969,485 A | 10/1999 | Hunt | |
| 6,278,364 B1* | 8/2001 | Robert | B60Q 1/444 |
| | | | 340/463 |
| 7,242,152 B2 | 7/2007 | Dowling et al. | |
| 7,306,341 B2 | 12/2007 | Chang | |
| 7,401,934 B2 | 7/2008 | Hunt | |
| 7,495,671 B2 | 2/2009 | Chemel et al. | |
| 7,502,034 B2 | 3/2009 | Chemel et al. | |
| 8,324,826 B2 | 12/2012 | Verberkt et al. | |
| 8,938,468 B2 | 1/2015 | Morgan et al. | |
| 9,167,672 B2 | 10/2015 | Engelen et al. | |
| 9,400,856 B2 | 7/2016 | Striegel | |
| 9,677,755 B1 | 6/2017 | Linnell et al. | |
| 2004/0252486 A1 | 12/2004 | Krause | |
| 2005/0275626 A1 | 12/2005 | Mueller et al. | |
| 2009/0105856 A1 | 4/2009 | Kurt et al. | |
| 2009/0284966 A1* | 11/2009 | Crookham | F21S 8/033 |
| | | | 362/231 |
| 2011/0035404 A1 | 2/2011 | Morgan et al. | |
| 2012/0095745 A1* | 4/2012 | Le Guevel-Scholtens | ............... |
| | | | H05B 47/155 |
| | | | 703/13 |
| 2012/0286670 A1 | 11/2012 | Van Herk et al. | |
| 2014/0267308 A1* | 9/2014 | Mcnerney | G06T 13/20 |
| | | | 345/473 |
| 2020/0187332 A1* | 6/2020 | Mizerak | H05B 47/155 |
| 2020/0214787 A1 | 7/2020 | Hallack et al. | |

OTHER PUBLICATIONS

Koen Buys (KU Leuven) "People Pose Detection" May 10, 2013, 35 page presentation.
Buys, et al., "An adaptable system for RGB-D based human body detection and pose estimation" Journal of Visual communication and Image Representation, Jan. 2014, webpage: https://dl.acm.org/doi/10.1016/j.jvcir.2013.03.011.
Wandt, et al. "A Kinematic Chain Space for Monocular Motion Capture", webpage: https://arxiv.org/pdf/1702.00186.pdf, Feb. 2, 2017.
Lin, et al, "A Vision-based Scheme for Kinematic Model Construction of Re-configurable Modular Robots", webpage: https://arxiv.org/pdf/1703.03941.pdf, Mar. 11, 2017.
Non Patent Literature, Wang, et al., "Designing an Adaptive Lighting Control System for Smart Buildings and Homes", Arizona State University, Apr. 2015.
Combined Search and Examination Report issued by the United Kingdom Intellectual Property Office for Application No. 1918093.4 dated Jun. 2, 2020 (9 pages).
Examination Report issued from the Germany Patent Office for related Application No. 102019133749.6 dated Oct. 23, 2020 (7 Pages Including Statement of Relevance).

* cited by examiner

Limit results by:

Brand:

Price per Fixture: $ —————— $$$

Total Price: $ —————— $$$

My Inventory:

Inventory Only: ☐ Yes   ☐ No

AUTOMATED RE-CREATION OF LIGHTING VISUAL FOR A VENUE

CROSS-REFERENCE TO RELATED APPLICATIONS

This application claims the benefit of U.S. Provisional Patent Application No. 62/777,493, filed on Dec. 10, 2018, which is hereby incorporated by reference in its entirety.

FIELD

Embodiments described herein relate to producing a lighting visual in a particular venue.

SUMMARY

A user interface that allows a user to build and/or preserve an idealized lighting visual (e.g., a lighting transition, a follow spot, etc.) in either a virtual or real-world environment to be re-created at a venue would be beneficial to users such as lighting designers, lighting/system technicians, lighting console operators, or the like. Additionally, storing data relating to the idealized lighting visual and automatically suggesting an achievable version of the lighting visual at the venue (e.g., limited by physical constraints of the venue) would be beneficial.

Currently, creating complex static or animated visuals in a real-world environment takes an extraordinary amount of time. Because the live event for which the lighting visual is being prepared has a firm deadline, the time to set up the lighting visual is quite valuable. The time constraints can add to the cost of setup. The lighting setup must be tested and updated for each scenic element or performer on the stage, utilizing the same and/or different lights in the system.

Once all system elements are placed, calibrated, and tested, the lighting system can be used for the live event. Often times, however, the live event is part of a tour, and the event is performed at many different venues. The entire setup process must be repeated at each new venue due to the changing physical constraints between venues. Additionally, if one or more lighting fixtures are repositioned, removed, replaced, or added, the setup process often needs to be repeated for the venue even if the setup process was already performed for that venue before the change.

Additionally, many live events require hundreds of lighting fixtures. Current lighting system setup techniques require many hours and are prone to human error. Even a team of highly skilled lighting designers do not have the ability to simply look at all the physical characteristics of a venue and quickly realize what configuration of lighting fixtures mounted at particular available mounting locations will produce the best available version of the originally intended lighting visual. There are simply too many lighting fixture brands, models, settings, and accessories to consider. Furthermore, there are many mounting locations available at each venue, and these mounting locations may be varied with regard to orientation, shape, and/or size. Some locations may fit only light fixtures of a certain size or type, while others require a particular mounting orientation for the lighting fixture. Still other mounting locations may not be helpful at all for a given desired lighting visual.

As a result, the best available lighting setup is often left undiscovered. Instead, the lighting designers and operators will typically settle on a setup that is tolerable with regard to the desired lighting visual(s). Often times, the lighting visual will be changed or sacrificed in the interest of time or cost savings, causing inconsistency in the live event from venue to venue. The selected lighting setup will also be better for some lighting visuals and worse for other lighting visuals. For instance, lighting designers or operators can tend to focus on what they believe to be the most important lighting visual for the show and base the selected lighting setup on that design disproportionately compared to the other lighting visuals for the show. This approach often guarantees the overall lighting setup is not the best available lighting setup to accomplish all the lighting visuals for the live event.

A lighting setup is also often manually adjusted for one lighting visual or one aspect of the lighting visual at a time. Serial evaluation of different portions of the lighting visuals is time-consuming and resource intensive. Such a technique is also prone to underutilizing particular lighting fixtures due to the initial selected mounting location, which can lead to procurement and/or use of superfluous lighting fixtures.

It is also human tendency to only think of utilizing lighting fixtures that the lighting designer or operator already has on hand or lighting fixtures with which the lighting designer or operator is already familiar. A lighting designer or operator would have to constantly study emerging technology and try to maintain knowledge of the variations of potential lighting fixtures to know when a new or different lighting fixture would be helpful in a given venue. There is too much information to process for even a team of experts when considering the variables of mounting location, mounting shape, mounting orientation, lighting fixture brand, lighting fixture model, lighting fixture setting, lighting fixture accessories, lighting fixture cost, lighting fixture functional lifespan, lighting fixture energy consumption, or the like.

To address the above concerns, systems and methods are described for re-creating complex lighting visuals for a venue. The systems and methods could eliminate the requirement of expertise on the part of the user in deciding the lighting fixture arrangement in a venue. The systems and methods could also greatly reduce the time and money required to set up a lighting system for a live event at a particular venue. Also, the accuracy of the lighting visuals at each new venue can be greatly improved. Thus, embodiments described herein provide, among other things, systems and methods of approximating a lighting visual at a venue.

Methods are described herein for generating a lighting design for a venue based on a lighting visual. The method includes receiving, by an electronic processor, a lighting visual selection. The method also includes generating lighting visual parameters based on the lighting visual selection, receiving one or more available lighting fixture mounting locations of the venue, and accessing lighting fixture data from a memory. The lighting fixture data includes candidate lighting fixtures for mounting at one or more of the available lighting fixture mounting locations. The method also includes generating a lighting design for the venue including a specified arrangement of lighting fixtures. The lighting design indicates which of the candidate lighting fixtures to mount in respective specified mounting locations of the one or more available lighting fixture mounting locations to produce a lighting effect based on the lighting visual selection.

In some embodiments, the methods also include receiving a second lighting visual selection, generating second lighting visual parameters based on the second lighting visual selection, and generating a second lighting design for the venue including a second specified arrangement of lighting fixtures. The second lighting design indicates which of the candidate lighting fixtures to mount in respective specified mounting locations of the one or more available lighting fixture mounting locations to produce a second lighting effect based on the lighting visual selection and the second lighting visual selection.

In some embodiments, the generating of the lighting design also includes generating a plurality of alternative specified arrangements of lighting fixtures for alternative lighting effects based on the lighting visual selection.

In some embodiments, the generating of the lighting design also includes ranking the plurality of alternative specified arrangements of lighting fixtures based on conformity of predicted lighting effects of the alternative specified arrangements relative to the lighting visual selection and displaying the ranking in a graphical user interface.

In some embodiments, the displaying of the ranking in the graphical user interface includes displaying an accuracy percentage for conformity of the predicted lighting effects relative to the lighting visual selection for each of the alternative specified arrangements.

In some embodiments, the lighting visual selection is received via a user interface.

In some embodiments, accessing lighting fixture data from the memory is limited to a subset of lighting fixture data included in the memory based on an input received via a user interface.

In some embodiments, the subset of lighting fixture data is determined by filtering the lighting fixture data of the memory based on one or more of lighting fixture pricing, lighting fixture brands, or lighting fixture features.

In some embodiments, the receiving of one or more available lighting fixture mounting locations of a venue includes receiving the one or more available lighting fixture mounting locations from a scanning device.

In some embodiments, the one or more available lighting fixture mounting locations include identifiers that are detectable by the scanning device.

In some embodiments, the scanning device includes one or more cameras and the electronic processor is used for determining the one or more available lighting fixture mounting locations of a venue from image data captured by one or more cameras.

Systems are described herein for generating a lighting design for a venue based on a lighting visual. The system includes a controller that includes an electronic processor and a memory that is electrically connected to the electronic processor. The memory stores instructions that when executed by the electronic processor configure the controller to receive a lighting visual selection, generate lighting visual parameters based on the lighting visual selection, receive one or more available lighting fixture mounting locations of the venue, and access lighting fixture data from a database. The lighting fixture data includes candidate lighting fixtures for mounting at one or more of the available lighting fixture mounting locations. The controller is also configured to generate the lighting design for the venue that includes a specified arrangement of lighting fixtures. The lighting design indicates which of the candidate lighting fixtures to mount in respective specified mounting locations of the one or more available lighting fixture mounting locations to produce a lighting effect based on the lighting visual selection.

In some embodiments, the controller is further configured to receive a second lighting visual selection, generate second lighting visual parameters based on the second lighting visual selection, and generate a second lighting design for the venue that includes a second specified arrangement of lighting fixtures. The second lighting design indicates which of the candidate lighting fixtures to mount in respective specified mounting locations of the one or more available lighting fixture mounting locations to produce a second lighting effect based on the lighting visual and the second lighting visual selection.

In some embodiments, the lighting design includes a plurality of alternative specified arrangements of lighting fixtures for alternative lighting effects based on the lighting visual selection.

In some embodiments, the systems also include a display device, and the controller is further configured to rank the plurality of alternative specified arrangements of lighting fixtures based on conformity of predicted lighting effects of the alternative specified arrangements relative to the lighting visual selection. The controller is further configured to display the ranking in a graphical user interface via the display device.

In some embodiments, the controller is further configured to display an accuracy percentage for conformity of the predicted lighting effects relative to the lighting visual selection for each of the alternative lighting effects.

In some embodiments, the systems also include a display device, and the controller is further configured to receive the lighting visual selection via a user interface displayed by the display device.

In some embodiments, the systems include a display device, and the controller is further configured to limit access of lighting fixture data from the database to a subset of lighting fixture data included in the database based on input received via a user interface displayed by the display device.

In some embodiments, the controller is further configured to determine the subset of lighting fixture data by filtering the lighting fixture data of the database based on one or more of lighting fixture pricing, lighting fixture brands, or lighting fixture features.

In some embodiments, the systems include a scanning device, and the controller is further configured to receive the one or more available lighting fixture mounting locations from the scanning device.

In some embodiments, the one or more available lighting fixture mounting locations include identifiers that are detectable by the scanning device.

In some embodiments, the scanning device includes one or more cameras and the controller is further configured to determine the one or more available lighting fixture mounting locations of the venue from image data captured by one or more cameras.

Methods are described herein for approximating a lighting visual at a venue. The method includes selecting the lighting visual, converting, with an electronic processor, a selected lighting visual into lighting visual parameters, receiving, with the electronic processor, potential mounting locations for one or more lighting fixtures at the venue, accessing, with the electronic processor, a database of potential lighting fixtures to be mounted at the potential mounting locations, and outputting, with the electronic processor, an arrangement of lighting fixtures indicating which type of lighting fixture should be mounted in which mounting location to approximate the lighting visual parameters at the venue.

Systems are described herein for approximating a lighting visual at a venue. The system includes an electronic processor. The electronic processor is configured to receive input data regarding the lighting visual, receive input data regarding potential mounting locations for one or more lighting fixtures at the venue, access a database of potential lighting fixtures, and output data indicating an arrangement of lighting fixtures indicating which type of lighting fixture should be mounted in which mounting location to approximate the lighting visual.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Analyzing a venue, considering a vast array of available lighting fixtures and lighting fixture settings, considering the mounting locations available at the venue, and determining improved configurations of lighting fixtures for the venue with current systems and methods is time consuming, tedious, unintuitive, and prone to mistakes and inaccuracies. Systems and methods are described herein for efficiently and accurately re-creating complex lighting visuals for a venue.

Figure 1:
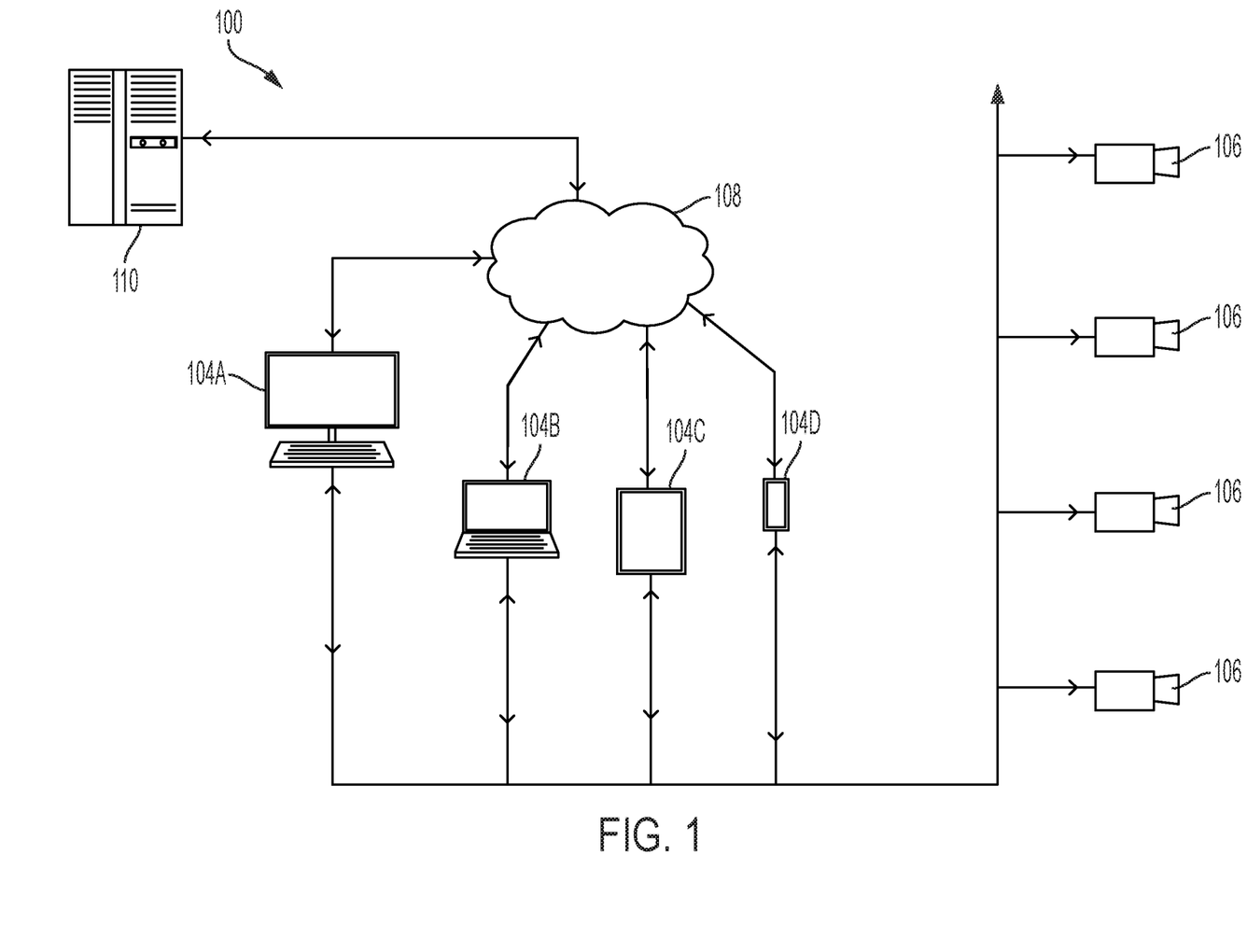
FIG. 1 illustrates a system for approximating a lighting visual at a venue.
Figure 3:
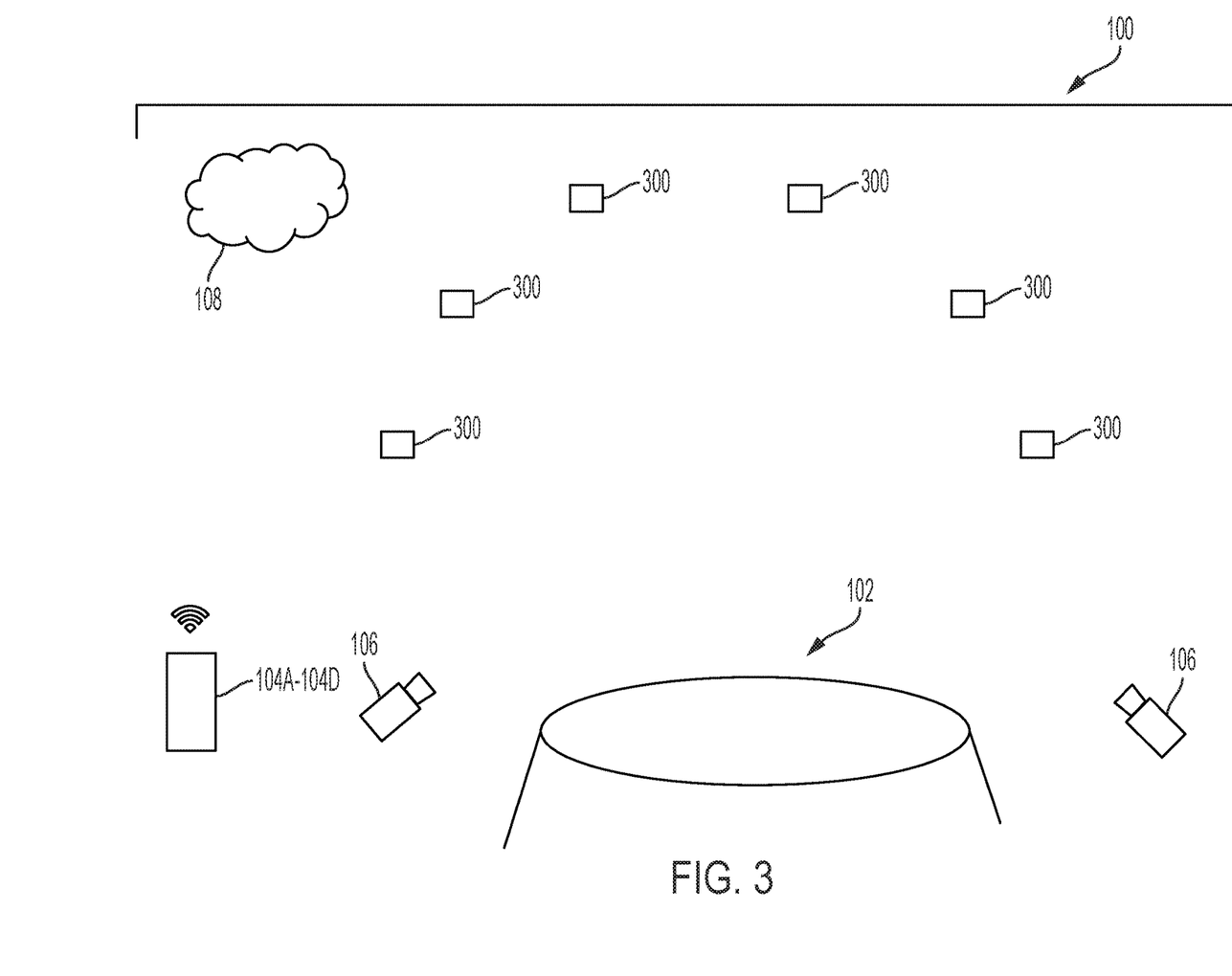
FIG. 3 illustrates cameras and mounting locations in a venue.

FIG. 1 illustrates a system 100 for approximating a lighting visual at a venue 102 (shown in FIG. 3). The system 100 includes a user input device 104A-104D, one or more cameras 106 (or other scanners), a network 108, and a server-side computer or server 110. The system 100 is provided as an example and, in some embodiments, the system 100 includes additional components. The user input device 104A-104D includes, for example, a personal or desktop computer 104A, a laptop computer 104B, a tablet computer 104C, a mobile phone (e.g., a smart phone) 104D, or some other device. Other user input devices may include, for example, an augmented reality headset or glasses. The cameras 106 may be integrated with the user input device 104A-104D, such as the camera of the mobile phone 104D, or the cameras 106 may be entirely separate from the user input device 104A-104D.

The user input device 104A-104D is configured to communicatively connect to the server 110 through the network 108 and provide information to, or receive information from, the server 110 related to control or operation of the system 100. The connections between the user input device 104A-104D and the network 108 and between the server 110 and the network 108 are, for example, wired connections, wireless connections, or a combination of wireless and wired connections.

The network 108 is, for example, a wide area network ("WAN") (e.g., a TCP/IP based network), a local area network ("LAN"), a neighborhood area network ("NAN"), a home area network ("HAN"), and/or personal area network ("PAN") employing any of a variety of communications protocols, such as Wi-Fi, Bluetooth, ZigBee, etc. In some implementations, the network 108 includes a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio, a Digital Enhanced Cordless Telecommunications ("DECT") network, a Digital AMPS ("IS-136/TDMA") network, or an Integrated Digital Enhanced Network ("iDEN") network, etc.

Figure 2:
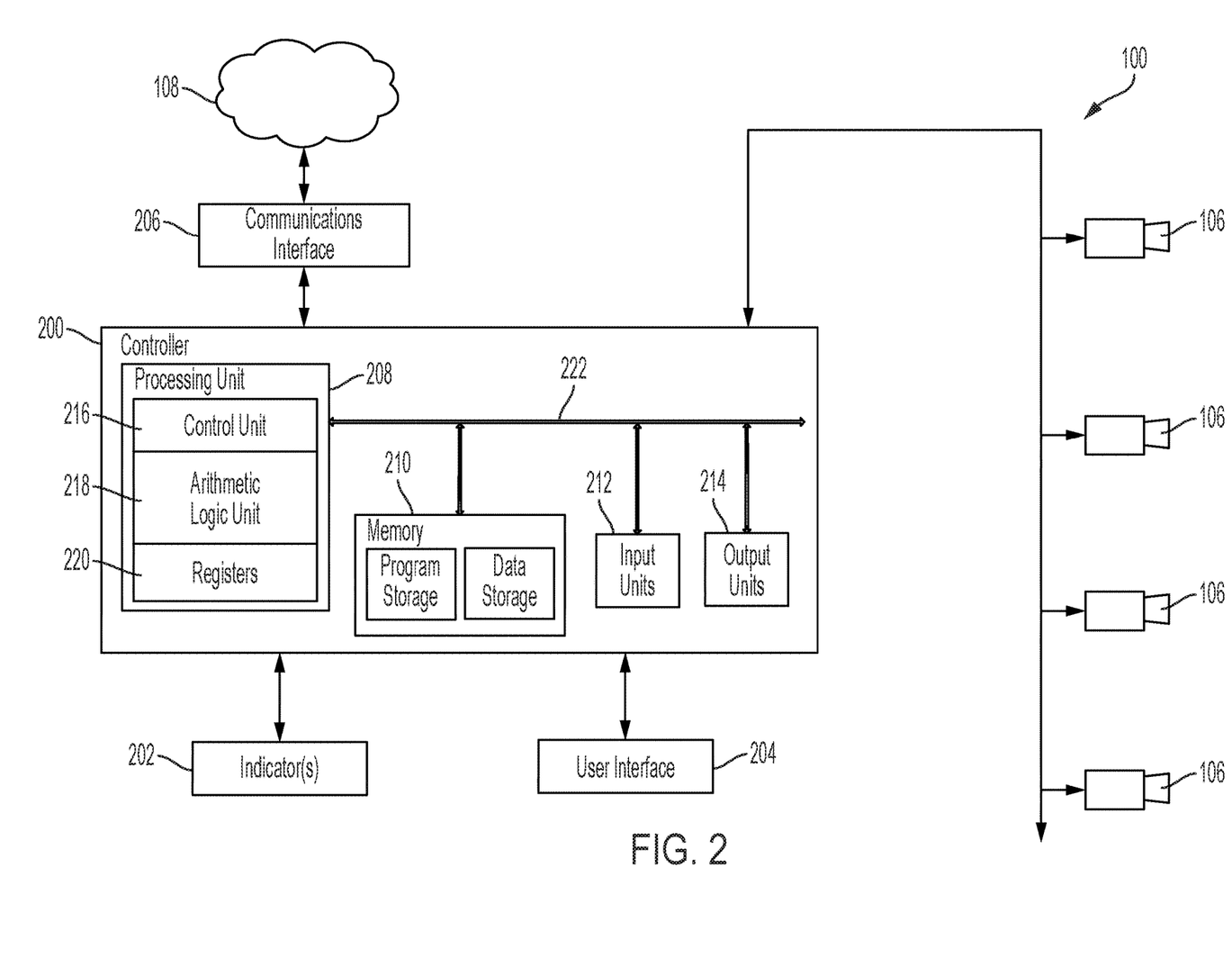
FIG. 2 illustrates a controller for the system of FIG. 1.

FIG. 2 illustrates a controller 200 for the system 100. The controller 200 is electrically and/or communicatively connected to a variety of modules or components of the system 100. For example, the illustrated controller 200 is connected to one or more indicators 202 (e.g., LEDs, a liquid crystal display ["LCD"], etc.), a user input or user interface 204 (e.g., a user interface of the user input device 104A-104D in FIG. 1), and a communications interface 206. The communications interface 206 is connected to the network 108 to enable the controller 200 to communicate with the server 110. The controller 200 includes combinations of hardware and software that are operable to, among other things, control the operation of the system 100, control the operation of the cameras 106, receive one or more signals from the cameras 106, communicate over the network 108, receive input from a user via the user interface 204, provide information to a user via the indicators 202, etc. In some embodiments, the indicators 202 and the user interface 204 are integrated together in the form of, for instance, a touch-screen interface.

In the embodiment illustrated in FIG. 2, the controller 200 is associated with the user input device 104A-104D. As a result, the controller 200 is illustrated in FIG. 2 as being connected to the cameras 106. In other embodiments, the controller 200 is associated with the server 110 and communicates through the network 108 to provide control signals to the cameras 106.

The controller 200 includes a plurality of electrical and electronic components that provide power, operational control, and protection to the components and modules within the controller 200 and/or the system 100. For example, the controller 200 includes, among other things, a processing unit 208 (e.g., a microprocessor, a microcontroller, or another suitable programmable device), a memory 210, input units 212, and output units 214. The processing unit 208 includes, among other things, a control unit 216, an arithmetic logic unit ("ALU") 218, and a plurality of registers 220 (shown as a group of registers in FIG. 2), and is implemented using a known computer architecture (e.g., a modified Harvard architecture, a von Neumann architecture, etc.). The processing unit 208, the memory 210, the input units 212, and the output units 214, as well as the various modules or circuits connected to the controller 200 are connected by one or more control and/or data buses (e.g., common bus 222). The control and/or data buses are shown generally in FIG. 2 for illustrative purposes. The use of one or more control and/or data buses for the interconnection between and communication among the various modules, circuits, and components would be known to a person skilled in the art in view of the embodiments described herein.

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 208 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. Software included in the implementation of the system 100 and controller 200 can be stored in the memory 210 of the controller 200. The software includes, for example, firmware, one or more applications, program data, filters, rules, one or more program modules, and other executable instructions. The controller 200 is configured to retrieve from the memory 210 and execute, among other things, instructions related to the control processes and methods described herein. In other embodiments, the controller 200 includes additional, fewer, or different components.

The user interface 204 is included to provide user control of the system 100 and/or the cameras 106. The user interface 204 is operably coupled to the controller 200 to control, for example, control or drive signals provided to the cameras 106. The user interface 204 can include any combination of digital and analog input devices required to achieve a desired level of control for the system 100. For example, the user interface 204 can include a computer having a display and input devices, a touch-screen display, a plurality of knobs, dials, switches, buttons, faders, or the like.

The controller 200 is configured to provide direct control or drive signals to the cameras 106. The control signals that are provided to the cameras 106 are provided, for example, based on a user input received by the controller 200 from the user interface 204. The controller 200 is also configured to receive one or more signals from the cameras 106 related to image or scan data. This scan data can be used by the controller 200 to gather input about the physical characteristics of the venue 102, such as potential mounting locations 300 (shown in FIG. 3). Other physical characteristics of the venue include dimensions of the venue 102 and/or objects or lighting targets within the venue. The controller 200 receives user input regarding a user selected lighting visual to be re-created at the venue 102 via the user interface 204. The controller 200 processes and stores lighting visual parameters, accesses a database or memory of available potential lighting fixtures and characteristics thereof, and outputs to the user an optimal arrangement of lighting fixtures for the venue 102. The lighting fixtures and their characteristics may be stored in a database or memory. The characteristics of a lighting fixture include available projection angles for one or more light beams, brightness (e.g., in lumens), reproducible colors, reproducible light beam shapes, etc.

FIG. 3 illustrates the user input device 104A-104D and the cameras 106 of the system 100 detecting light fixture mounting locations 300 in a venue 102. In some embodiments, the light fixture mounting locations 300 are entered by a user via manual entry of coordinates. In some embodiments, the one or more cameras 106 scan the venue 102 for appropriate mounting locations 300. The mounting locations 300 may include markings, such as a QR code for example, to allow for rapid detection by the one or more cameras 106. In other embodiments, the controller 200 includes one or more programs to detect objects that resemble a mounting plate, mounting rail, or the like, based on scan data from the cameras 106. One appropriate program is a simultaneous localization and mapping ("SLAM") program. Some embodiments include one or more potential mounting location 300 having a beacon, such as an infrared light source, disposed thereon. Some embodiments include a user designating potential mounting locations 300 via, for instance, an augmented reality interface.

Figure 4:
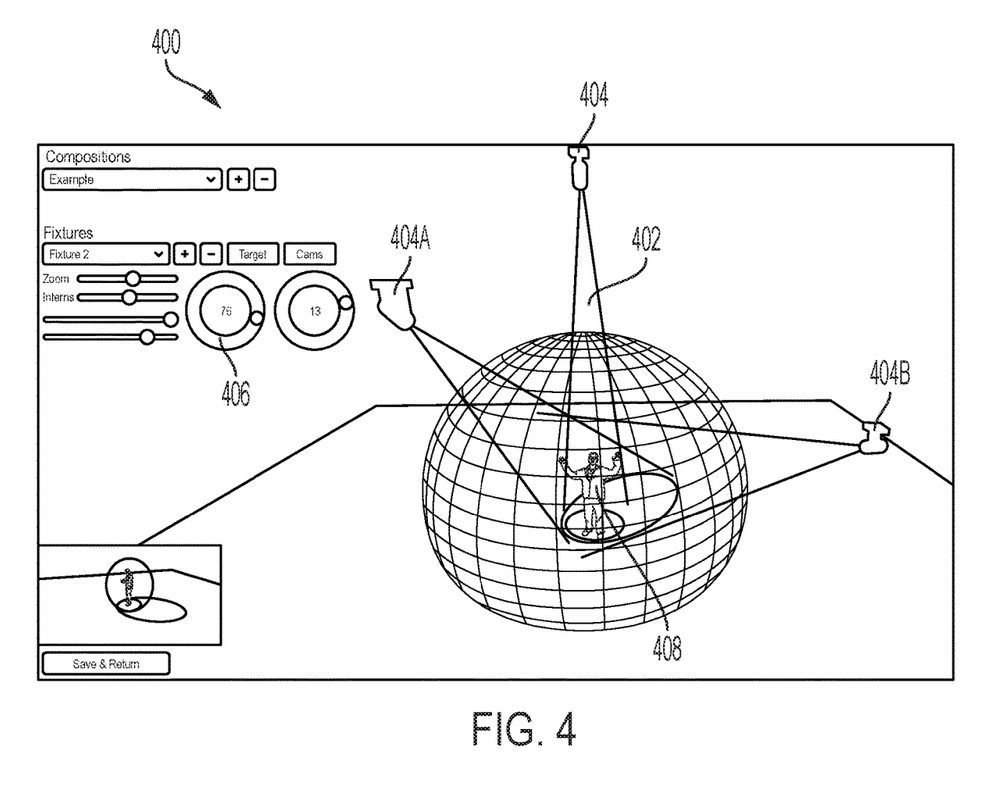
FIG. 4 illustrates an example user interface that can be interacted with via a user device of the system of FIG. 1.

FIG. 4 illustrates an example user interface 400 that can be interacted with via the user device 104A-104D. The user interface 400 is a virtual reality rendering of a lighting system. In the environment of the user interface 400, the user may select one or more desired lighting visuals by interacting with virtual lighting beams 402, the placement of virtual lighting fixtures 404 (e.g., which correspond to real-world counterpart lighting fixtures that receive control or drive signals from the controller 200), one or more virtual control icons 406, or the like. The lighting visuals can be of varying composition types including, but not limited to, static or dynamic combinations of lighting elements. Lighting visuals include, for example, moving lighting transitions, follow spots, and other dynamic lighting visuals (e.g., fading and other transitions). Lighting visuals can also include static background lighting (e.g., color, intensity, saturation, fading, etc.).

In addition to picking the desired lighting effects and light placements, the user may also control which of the virtual lighting fixtures 404 operates at a given time. With such control inputs, the user may coordinate multiple virtual lighting fixtures 404 to sequentially follow a moving virtual object 408, such as a virtual representation of a performer. For instance, a first lighting fixture 404A may act as a follow spot on the performer 408. When the first lighting fixture 404A reaches a limit on its follow spot capabilities because of the location of the performer 408, a second lighting fixture 404B takes over the follow spot task. This way, the desired lighting visuals are maintained regardless of the location of the performer 408.

The user interface 400, in some embodiments, further includes reconstructions of one or more objects, hazards, or the like detected at the venue 102. The user interface 400 may further include information or reconstructions of line-of-sight occlusions, collision hazards, pathways of moving props, pathways of moving hoists, or the like.

Once the one or more desired lighting visuals are completed in the environment of the user interface 400, the user may save the one or more desired lighting visuals to be re-created at the venue 102. When the desired lighting visuals created with the user interface 400 are to be re-created at the venue 102, the controller 200 generates corresponding control or drive signals for the lighting fixtures at the venue 102 (i.e., the real-world counterparts of the virtual lighting fixtures 404). In some embodiments, the user interface 400 is available locally on the user device 104A-104D, accessible on one or more servers 110 via the user device 104A-104D, or the like.

Additionally or alternatively, the user can create one or more desired lighting visuals at a real-world venue separate from the venue 102 according to conventional methods. Once the one or more desired lighting visuals are completed in the real-world venue, the user may capture the visual data at the target location of the lighting fixtures and/or the control data for the lighting fixtures with one or more cameras. The user can further manually log and input parameter data regarding the lighting fixtures, the stage, the venue, some combination thereof, or the like.

Figure 5:
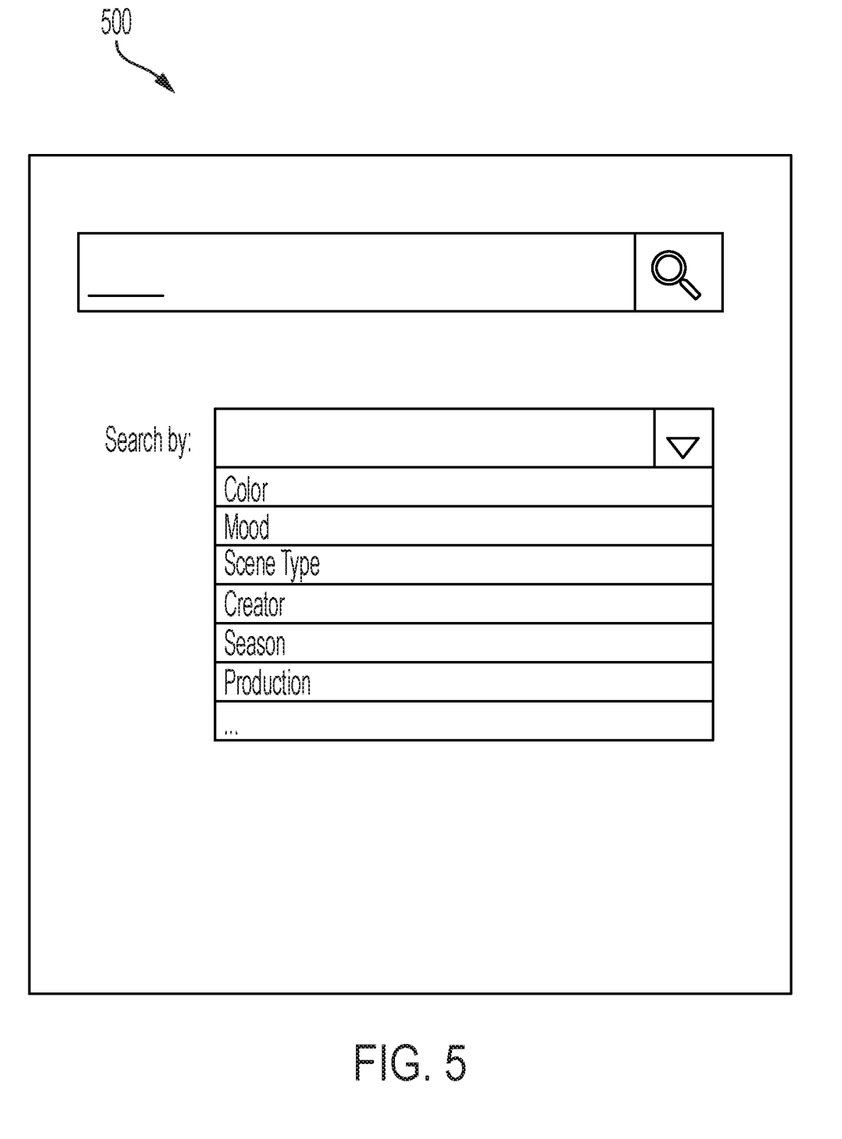
FIG. 5 illustrates an example of a database or memory interface that can be interacted with via a user device of the system of FIG. 1.

Additionally or alternatively, lighting visuals can be created and added to a database by the user or another entity, and the user may select one or more desired lighting visuals from the database. FIG. 5 illustrates an example of a database interface 500 that can be interacted with via the user device 104A-104D. The lighting visuals in the database may carry metatags or other indication data to allow the user to search for a particular lighting visual based on colors used, described mood of the lighting visual, the type of scene for which the lighting visual may be appropriate, the creator of the lighting visual, the season which the lighting visual evokes, the production or productions in which the lighting visual has been used, or the like. In some embodiments, the user is able to preview videos or images (whether virtual or real) of the lighting visuals as part of the selection process. These lighting visuals in the database may be available locally on the user device 104A-104D, accessible on one or more servers 110 via the user device 104A-104D, or the like.

Figure 6:
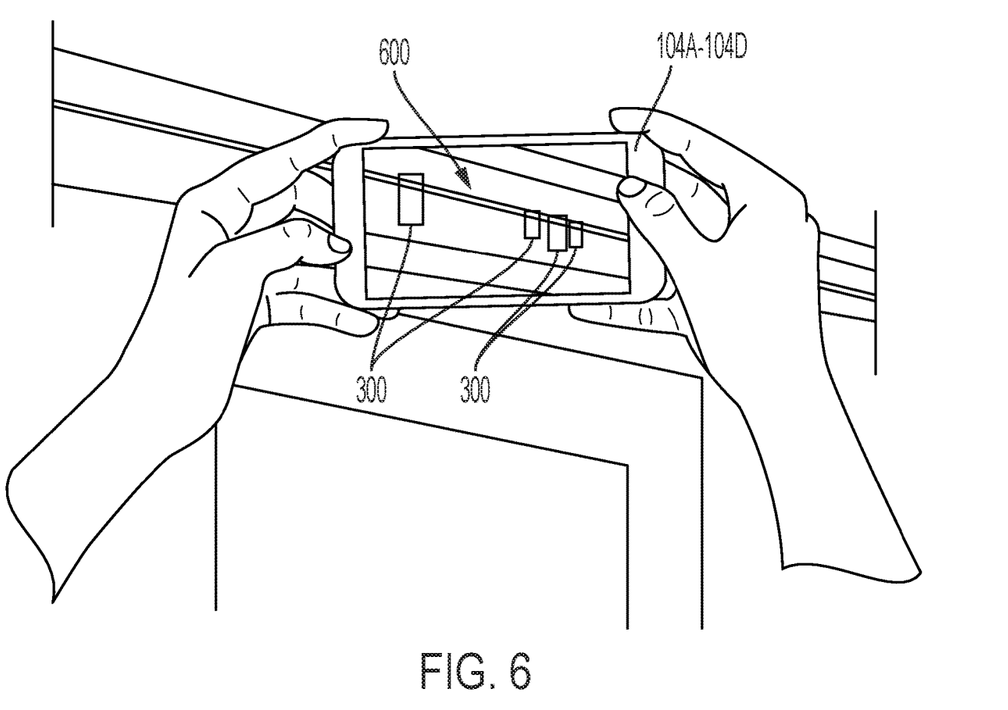
FIG. 6 illustrates an example of a user device that includes the one or more cameras of the system of FIG. 1 to capture mounting locations in a venue.

FIG. 6 illustrates an example of the user device 104A-104D that includes the one or more cameras 106 to capture the mounting locations 300 in a venue 102. As shown in FIG. 6, the display 600 on the user device 104A-104D is an augmented reality display. The augmentations to the scene captured by the one or more cameras 106 are superimposed on the scene to show a user the user device 104A-104D is correctly detecting the available mounting locations 300. If a particular mounting location 300 is not detected, a user could, for instance, touch the location on the display 600 to indicate the missing mounting location 300. The user device 104A-104D could then analyze the indicated portion of the display 600 to detect the mounting location 300 (e.g., using a SLAM program) or may simply designate the indicated portion as a mounting location 300.

Figure 7:
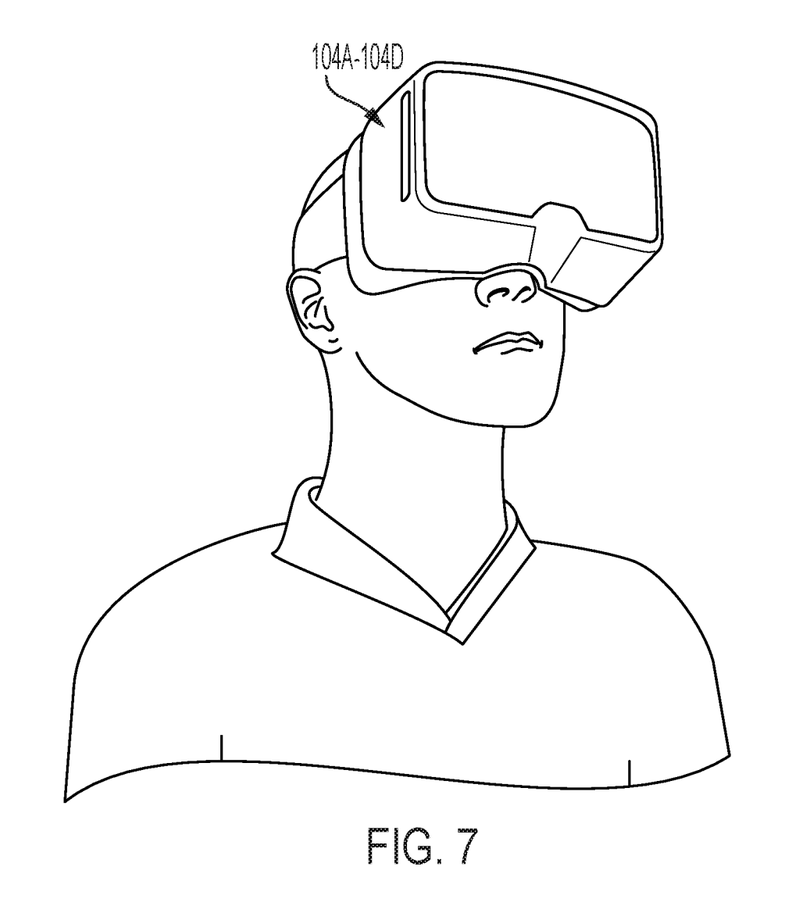
FIG. 7 illustrates an example of a user device of the system of FIG. 1 that includes an augmented reality headset.

FIG. 7 illustrates an additional or alternative example of the user device 104A-104D that is shown in the form of an augmented reality headset. The headset user device 104A-104D may work in conjunction with hand gestures, voice commands, or the like.

Figure 8:
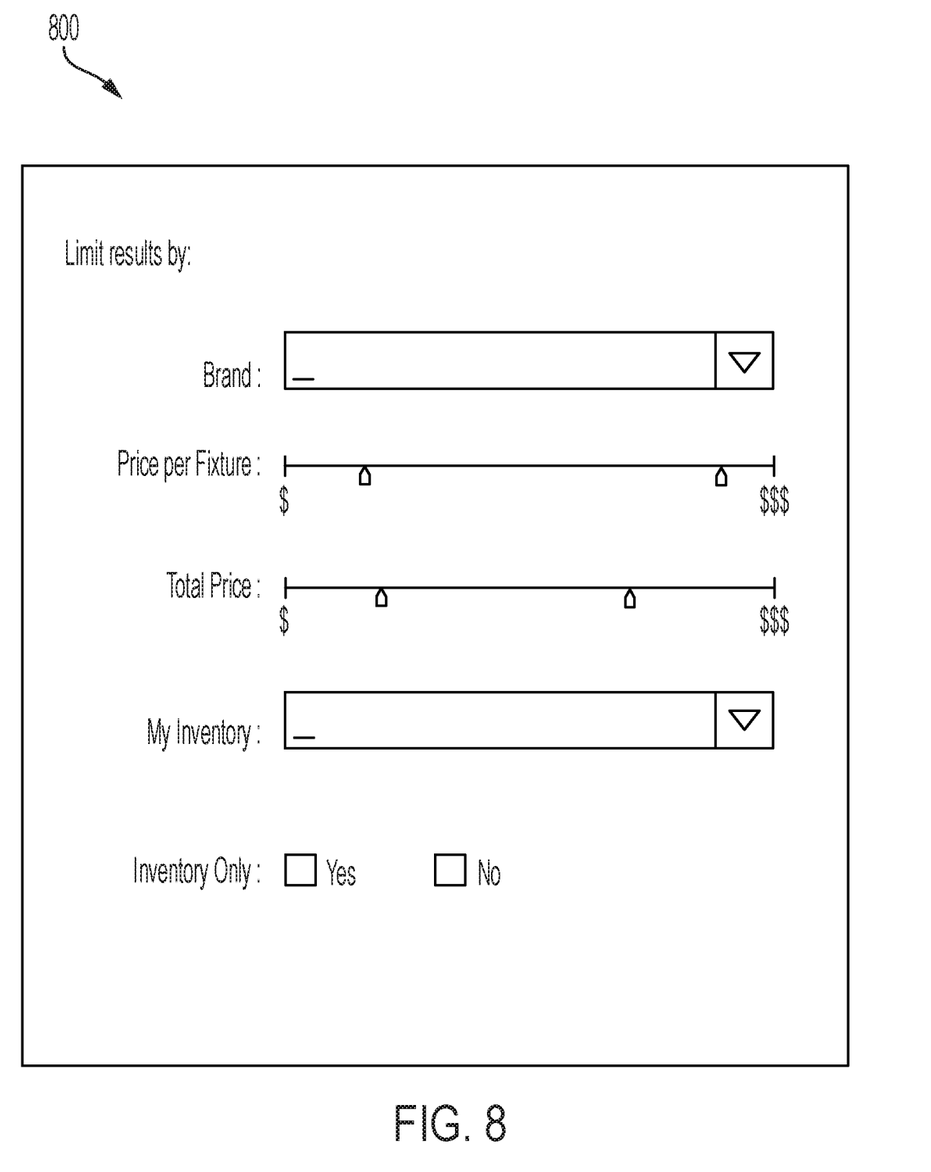
FIG. 8 illustrates an example of a menu interface that can be interacted with via a user device of the system of FIG. 1 to select potential lighting fixture parameters.

FIG. 8 illustrates an example of a menu interface 800 that can be interacted with via the user device 104A-104D to select potential lighting fixture parameters. Before the user receives the indication of lighting fixtures to be used and the arrangement of the lighting fixtures with regard to the mounting locations 300, the user may indicate any limitations on the lighting fixtures to be considered. For instance, the user can limit the usable lighting fixtures to the inventory the user already has on hand, to a certain brand of lighting fixtures, to certain types of lighting fixtures, to a certain price range, or the like.

Figure 9:
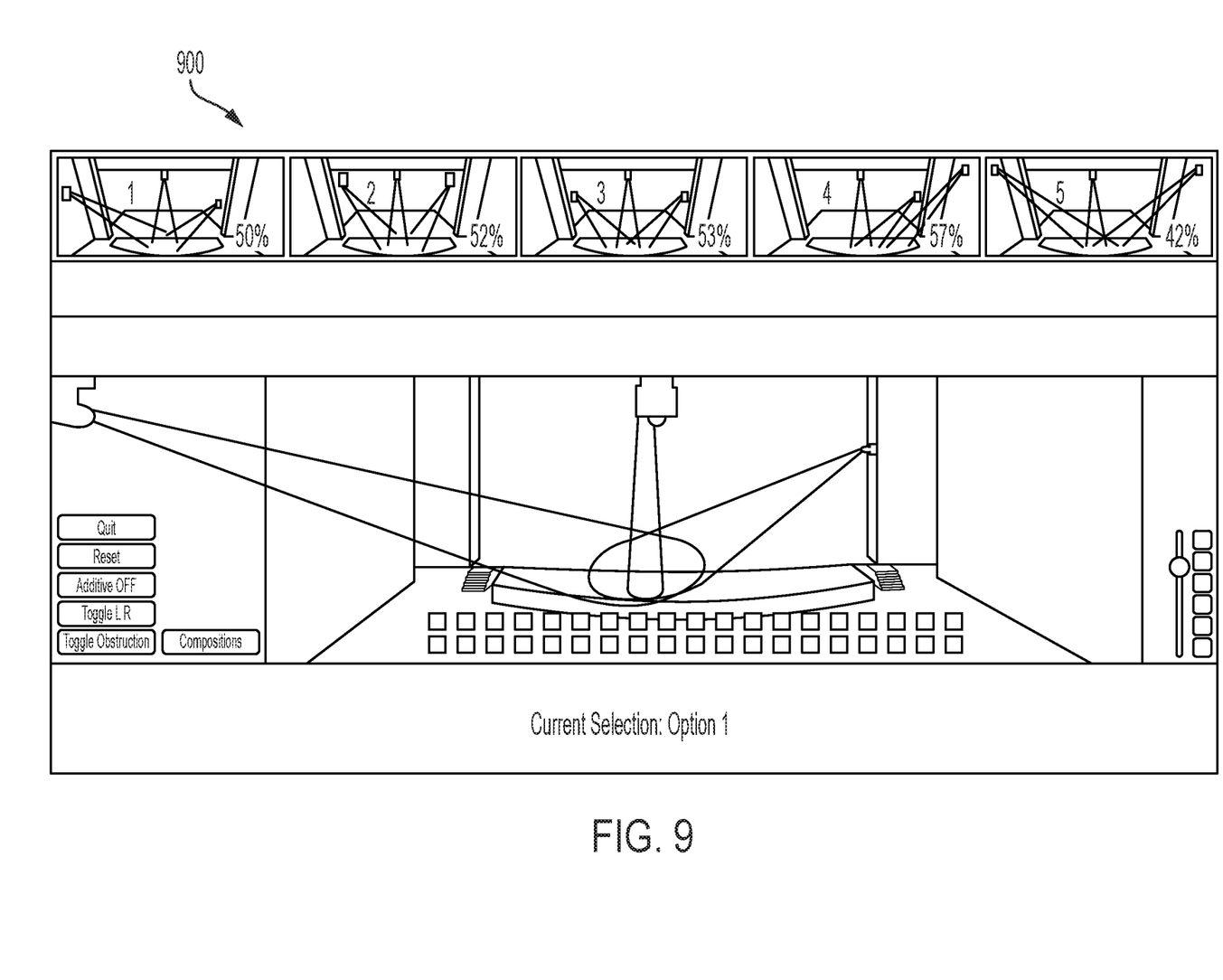
FIG. 9 illustrates an example of a recommendation interface that can be interacted with via a user device of the system of FIG. 1 to select a lighting fixture arrangement.

FIG. 9 illustrates an example of a recommendation interface 900 to be viewed by and/or interacted with by the user to select or inquire about one or more recommended lighting fixture arrangements. Once the user has made any appropriate selections, the user device 104A-104D may display one or more lighting fixture arrangements on a recommendation interface 900. A user can interact with the recommendation interface 900 via the user device 104A-104D or another device to select the user's desired lighting fixture arrangement. Each option may include data such as the percent accuracy compared to the one or more intended lighting visuals, a price of the lighting fixture arrangement, an estimated time to set up the lighting fixture arrangement, whether the lighting fixture arrangement requires the user to purchase or rent more lighting fixtures, or the like. The recommendation interface 900 may be a series of screens with which the user may or may not interact, a virtual environment modeling the venue 102 and the lighting fixtures therein, an augmented reality view of the venue 102 with the lighting fixtures superimposed thereon, or the like.

Figure 10:
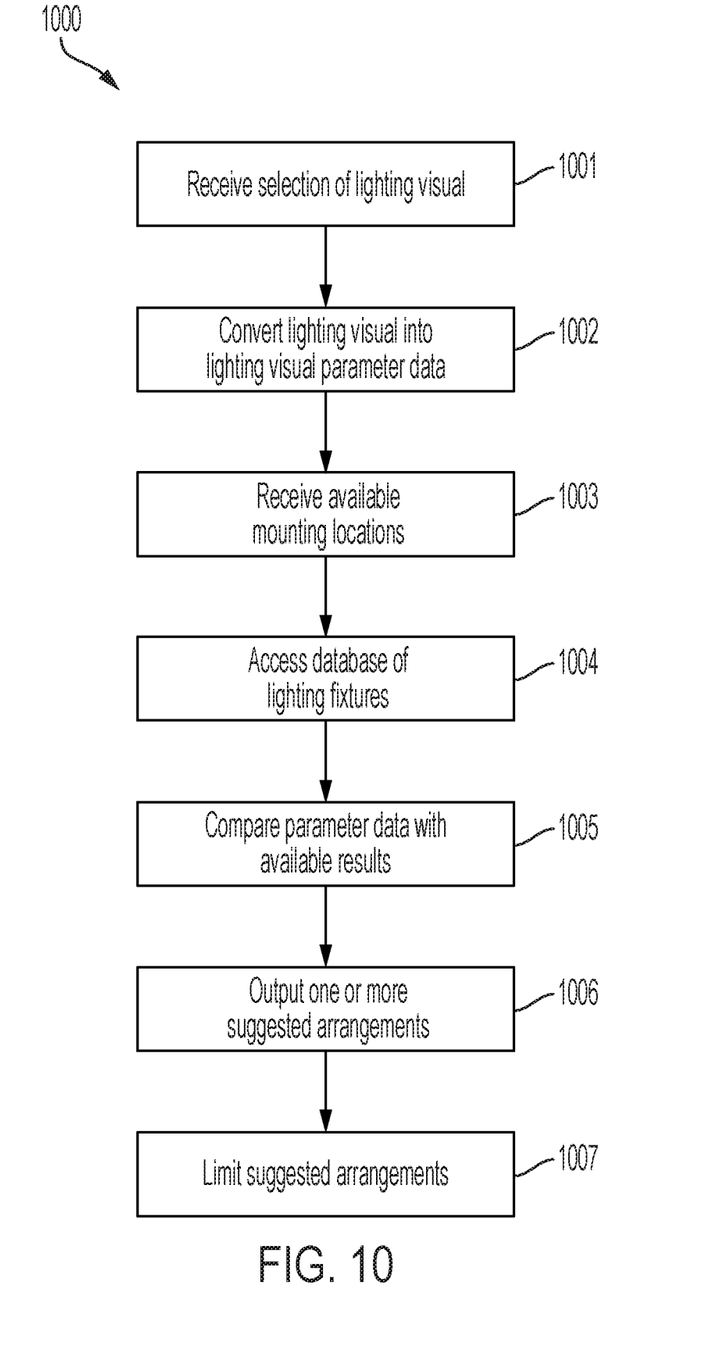
FIG. 10 illustrates a flowchart of an example method of approximating a lighting visual at a venue.

FIG. 10 illustrates a method 1000 for approximating a lighting visual at the venue 102 (see FIG. 3) performed by the system 100. For example, a lighting design or arrangement of light fixtures is generated for the venue 102 based on one or more lighting visuals. The method 1000 is described herein as being performed by the processing unit 208 of the user device 104A-104D. However, in some embodiments, the method 1000 (or a portion thereof) may be performed by one or more other devices, such as one or more servers 110 accessible through the network 108.

As illustrated in FIG. 10, method 1000 includes receiving a user selection of one or more lighting visuals (STEP 1001). Example ways to receive a selected lighting visual are described above and include creating the lighting visual in the virtual environment user interface 400, creating and capturing information regarding a lighting visual created at a venue (e.g., a venue other than the venue 102), and selecting a lighting visual from a database through the database interface 500. In some embodiments, multiple lighting visuals are selected at the same time. In such embodiments, the controller 200 is configured to implement or achieve the lighting visuals independently of one another or in combination with one another (e.g., based on combined or aggregate lighting visual parameter data).

The method 1000 also includes converting the selected lighting visual into lighting visual parameters or lighting visual parameter data (STEP 1002). In some embodiments, the lighting visual parameter data includes data corresponding to attack angle of one or more light beams, brightness of the target area to be illuminated, color of the target area to be illuminated, shape of the illumination at the target area to be illuminated, or the like. In some embodiments, the lighting visual parameter data corresponds to mathematical representations or values for the lighting visual that are set or selected in a virtual environment.

The method 1000 further includes receiving data regarding potential mounting locations 300 for one or more lighting fixtures (STEP 1003). In some embodiments, the received data also includes physical characteristics of the venue, such as the dimensions of the venue, objects within the venue, etc. This mounting location data may be received in any appropriate manner. Example ways to receive the mounting location data are described above and include manual entry of coordinates, visual scanning using one or more cameras 106 (e.g., and using a SLAM program), augmented reality scanning, receiving signals from beacons connected to each mounting location 300, or the like.

The method 1000 also includes accessing a database of potential lighting fixtures to be mounted at the potential mounting locations 300 (STEP 1004). The method 1000 also includes comparing the lighting visual parameter data with the potential lighting fixtures (STEP 1005). Due to the different possible configurations of the potential lighting fixtures that can be mounted at the mounting locations 300, the characteristics (e.g., performance capabilities) of the light fixtures from the potential lighting fixtures can be compared to the lighting visual parameter data. Based on the comparison of the performance capabilities needed to produce the lighting visual and the performance capabilities of the potential light fixtures, the light fixtures most suitable for re-creating the lighting visual can be selected. In some embodiments, other physical characteristics of a venue are taken into consideration when comparing light fixtures from the potential lighting fixtures to the lighting visual parameter data, such as the dimensions of the venue, objects within the venue, etc.

The method 1000 further includes outputting one or more suggested arrangements of lighting fixtures indicating which type of lighting fixture should be mounted in each corresponding mounting location 300 (STEP 1006). The resulting suggested arrangements may be accompanied by a percent accuracy when compared to the lighting visual parameters. When more than one suggested arrangement is presented, the user can select from the possible suggested arrangements. In some embodiments, prior to selection, the recommendation interface 900 is abbreviated with summary information. After selection, more detailed information regarding the selected suggested arrangement is available. If the user wishes, the user may return to the previous screen in the recommendation interface 900.

Either before or after the output step (STEP 1006), shown as being after the output step in FIG. 10, the method 1000 further includes limiting the suggested arrangements (STEP 1007). The suggested arrangements may be limited in any appropriate manner. Example ways to limit the suggested arrangement results are described above and include utilizing a menu interface 800 to limit the usable lighting fixtures to the inventory the user already has on hand, to a certain brand of lighting fixtures, to certain types of lighting fixtures, to a certain price range, to lighting fixtures that can be shipped to the user's location by a designated deadline, or the like. If the limiting step is performed after STEP 1006, the resulting suggested arrangements are then updated on the recommendation interface 900.

Thus, embodiments described herein provide, among other things, systems and methods of approximating a lighting visual at a venue. Various features and advantages of some embodiments are set forth in the following claims.

What is claimed is:

1. A method of generating a lighting design for a venue based on a lighting visual, the method comprising:
   receiving, by an electronic processor, a lighting visual selection;
   generating, by the electronic processor, lighting visual parameters based on the lighting visual selection;
   receiving, by the electronic processor, one or more available lighting fixture mounting locations of the venue; wherein receiving one or more available lighting fixture mounting locations of the venue includes receiving one or more available lighting fixture mounting locations from a scanning device;
   accessing, by the electronic processor, lighting fixture data from a memory, wherein the lighting fixture data includes candidate lighting fixtures for mounting at one or more of the available lighting fixture mounting locations; and
   generating, by the electronic processor, the lighting design for the venue including a specified arrangement of lighting fixtures, the lighting design indicating which of the candidate lighting fixtures to mount in respective specified mounting locations of the one or more available lighting fixture mounting locations to produce a lighting effect at the venue based on the lighting visual selection.

2. The method of claim 1, further comprising:
   receiving, by an electronic processor, a second lighting visual selection;
   generating, by the electronic processor, second lighting visual parameters based on the second lighting visual selection; and
   generating, by the electronic processor, a second lighting design for the venue including a second specified arrangement of lighting fixtures, the second lighting design indicating which of the candidate lighting fixtures to mount in respective specified mounting locations of the one or more available lighting fixture mounting locations to produce a second lighting effect based on the lighting visual selection and the second lighting visual selection.

3. The method of claim 1, wherein generating the lighting design further includes generating a plurality of alternative specified arrangements of lighting fixtures for alternative lighting effects based on the lighting visual selection.

4. The method of claim 3, wherein generating the lighting design further includes:
   ranking the plurality of alternative specified arrangements of lighting fixtures based on conformity of predicted lighting effects of the alternative specified arrangements relative to the lighting visual selection, and
   displaying the ranking in a graphical user interface.

5. The method of claim 4, wherein displaying the ranking in the graphical user interface includes displaying an accuracy percentage for conformity of the predicted lighting effects relative to the lighting visual selection for each of the alternative specified arrangements.

6. The method of claim 1, wherein the lighting visual selection is received via a user interface.

7. The method of claim 1, wherein the access of lighting fixture data from the memory is limited to a subset of lighting fixture data included in the memory based on an input received via a user interface.

8. The method of claim 7, wherein the subset of lighting fixture data is determined by filtering the lighting fixture data of the memory based on one or more of lighting fixture pricing, lighting fixture brands, or lighting fixture features.

9. The method of claim 1, wherein the scanning device includes one or more cameras and the one or more available lighting fixture mounting locations of the venue are determined, by the electronic processor, from image data captured by one or more cameras.

10. The method of claim 1, wherein the one or more available lighting fixture mounting locations include identifiers that are detectable by the scanning device.

11. A system for generating a lighting design for a venue based on a lighting visual, the system comprising:
a scanning device;
a controller that includes an electronic processor; and
a memory electrically connected to the electronic processor, the memory storing instructions that when executed by the electronic processor configure the controller to:
receive a lighting visual selection,
generate lighting visual parameters based on the lighting visual selection,
receive one or more available lighting fixture mounting locations of the venue from the scanning device,
access lighting fixture data from a database, wherein the lighting fixture data includes candidate lighting fixtures for mounting at one or more of the available lighting fixture mounting locations, and
generate the lighting design for the venue that includes a specified arrangement of lighting fixtures, the lighting design indicating which of the candidate lighting fixtures to mount in respective specified mounting locations of the one or more available lighting fixture mounting locations to produce a lighting effect at the venue based on the lighting visual selection.

12. The system of claim 11, wherein the one or more available lighting fixture mounting locations include identifiers that are detectable by the scanning device.

13. The system of claim 11, wherein the controller is further configured to:
receive a second lighting visual selection;
generate second lighting visual parameters based on the second lighting visual selection; and
generate a second lighting design for the venue that includes a second specified arrangement of lighting fixtures, the second lighting design indicating which of the candidate lighting fixtures to mount in respective specified mounting locations of the one or more available lighting fixture mounting locations to produce a second lighting effect based on the lighting visual selection and the second lighting visual selection.

14. The system of claim 11, wherein the lighting design further includes a plurality of alternative specified arrangements of lighting fixtures for alternative lighting effects based on the lighting visual selection.

15. The system of claim 14, wherein the system further comprises a display device, and the controller is further configured to:
rank the plurality of alternative specified arrangements of lighting fixtures based on conformity of predicted lighting effects of the alternative specified arrangements relative to the lighting visual selection; and
display, via the display device, the rank in a graphical user interface.

16. The system of claim 15, wherein the controller is further configured to display an accuracy percentage for conformity of the predicted lighting effects relative to the lighting visual selection for each of the alternative lighting effects.

17. The system of claim 11, wherein the system further comprises a display device, and the controller is further configured to receive the lighting visual selection via a user interface displayed by the display device.

18. The system of claim 11, wherein the system further comprises a display device, and the controller is further configured to limit access of lighting fixture data from the database to a subset of lighting fixture data included in the database based on an input received via a user interface displayed by the display device.

19. The system of claim 18, wherein the controller is further configured to determine the subset of lighting fixture data by filtering the lighting fixture data of the database based on one or more of lighting fixture pricing, lighting fixture brands, or lighting fixture features.

20. The system claim 11, wherein the scanning device includes one or more cameras and the controller is further configured to determine the one or more available lighting fixture mounting locations of the venue from image data captured by one or more cameras.

* * * * *